United States Patent
Gumbrell et al.

(10) Patent No.: US 9,072,081 B2
(45) Date of Patent: Jun. 30, 2015

(54) CELLULAR TELECOMMUNICATIONS NETWORKS FOR TEMPORARILY ASSOCIATING UNIQUE CONNECTION NUMBERS WITH TERMINALS HAVING TOKEN IDENTIFICATION MODULES

(71) Applicant: VODAFONE GROUP PLC, Newbury (GB)

(72) Inventors: Richard Gumbrell, Newbury (GB); Graeme Sandieson, Newbury (GB); Greg Reeve, Newbury (GB); Tony Smith, Deveon (GB); Yakeen Prabdial, Newbury (GB)

(73) Assignee: VODAFONE GROUP PLC, Newbury, Berkshire (GB)

( * ) Notice: Subject to any disclaimer, the term of this patent is extended or adjusted under 35 U.S.C. 154(b) by 0 days.

(21) Appl. No.: 14/068,965

(22) Filed: Oct. 31, 2013

(65) Prior Publication Data

US 2014/0220951 A1 Aug. 7, 2014

Related U.S. Application Data

(63) Continuation of application No. 13/351,825, filed on Jan. 17, 2012, now abandoned, which is a continuation
(Continued)

(30) Foreign Application Priority Data

Apr. 2, 2008 (GB) .................................. 0805964.4
Aug. 20, 2008 (GB) .................................. 0815200.1

(51) Int. Cl.
*H04W 4/00* (2009.01)
*H04W 76/02* (2009.01)
(Continued)

(52) U.S. Cl.
CPC ............ *H04W 76/021* (2013.01); *H04W 4/005* (2013.01); *H04W 4/12* (2013.01); *H04W 8/26* (2013.01); *H04W 24/02* (2013.01)

(58) Field of Classification Search
CPC ..... H04W 12/06; H04W 80/04; H04W 8/082; H04W 12/08; H04W 12/12; H04W 88/182; H04W 8/26; H04W 28/06; H04W 36/14; H04W 4/005; H04W 4/12; H04W 60/00; H04W 76/02; H04W 76/021; H04W 76/022; H04W 8/04; H04W 8/02; H04W 8/00
USPC ........... 455/435.1, 418, 419, 422.1, 551, 557; 370/328, 338; 709/203, 228; 726/4, 9
IPC ............. H04W 8/04, 8/02, 12/08, 12/12, 12/06, H04W 4/005, 76/02, 60/00, 76/021, 6/022
See application file for complete search history.

(56) References Cited

U.S. PATENT DOCUMENTS 6,970,719 B1 * 11/2005 McConnell et al. ....... 455/554.1
7,072,354 B1 7/2006 Beathard
(Continued)

FOREIGN PATENT DOCUMENTS

GB 2 378 094 1/2003
GB 2 378 095 1/2003
(Continued)

OTHER PUBLICATIONS

International Search Report dated Jun. 23, 3009 in PCT/GB2009/050321.
(Continued)

*Primary Examiner* — Fred Casca
(74) *Attorney, Agent, or Firm* — B. Aaron Schulman, Esq.; Nicholas Trenkle; Stites & Harbison, PLLC.

(57) ABSTRACT

A cellular telecommunications network that facilitates communication connections for terminals having identification modules that are not associated with a subscriber record or Mobile Subscriber Integrated Services Digital Network (MSISDN). The cellular telecommunications network implements providing a pool of unique connection numbers; in response to a request for communication with a device incorporating a token identification module, assigning a selected one of the pooled numbers to the token identification module in a location register; and initiating a reconnection event, thereby providing the assigned number to the device by associating the device with a temporary unique connection number in the location register. Embodiments described are directed to Machine-to-Machine (M2M) client terminals with embedded token identification modules.

12 Claims, 5 Drawing Sheets

Related U.S. Application Data of application No. 13/118,014, filed on May 27, 2011, now abandoned, which is a continuation of application No. 12/935,788, filed as application No. PCT/GB2009/050331 on Apr. 2, 2009, now abandoned.

(51) Int. Cl.
*H04W 8/26* (2009.01)
*H04W 24/02* (2009.01)
*H04W 4/12* (2009.01)

(56) References Cited

U.S. PATENT DOCUMENTS

| | | |
|---|---|---|
| 7,302,255 B1 | 11/2007 | Lundy et al. |
| 7,444,148 B1 | 10/2008 | Cook |
| 7,954,141 B2 | 5/2011 | De Lutiis et al. |
| 2002/0193100 A1 | 12/2002 | Riffe et al. |
| 2003/0028671 A1 | 2/2003 | Mehta et al. |
| 2003/0084165 A1 | 5/2003 | Kjellberg et al. |
| 2005/0032546 A1 | 2/2005 | Kehr |
| 2007/0169107 A1 | 7/2007 | Huttunen |
| 2007/0254711 A1 | 11/2007 | Young et al. |
| 2009/0017817 A1 | 1/2009 | Bleckert et al. |
| 2010/0136971 A1* | 6/2010 | Holter et al. ............ 455/435.1 |
| 2014/0161037 A1 | 6/2014 | Gumbrell et al. |

FOREIGN PATENT DOCUMENTS

| | | |
|---|---|---|
| GB | 2 378 097 | 1/2003 |
| GB | 2 439 768 | 1/2008 |
| WO | WO-00/57596 | 9/2000 |

OTHER PUBLICATIONS

International Search Report dated Jun. 24, 2009 in PCT/GB2009/050331.
3GPP Technical Specification, vol. 8.6.0, Jun. 2008, pp. 1-917.
3GPP Technical Specification 23.012, vol. 8.0.0, Jun. 2008, pp. 1-52.
3GPP Technical Specification 23.060, vol. 8.1.0, Jun. 2008, pp. 1-259.
3GPP Technical Report, vol. 2.2 dated Mar. 2008, pp. 1-46.
3GPP TSG-SA WG2 Meeting #63, Athens, Greece, Feb. 18-22, 2008, 13 pages.
3GPP Technical Report, vol. 2.1 dated Mar. 2008, pp. 1-28.
3GPP TSG SA WG3 Security #50, Feb. 25-29, 2008, Sanya, China, p. 1-23.
Signalling System No. 7 (SS7)—Signalling Connection Control Part (SCCP), American National Standard for Telecommunications, 15 pages.
Calhoun, et al, Diameter Base Protocol, AAA Working Group Internet Draft—Internet Draft, pp. 1-134.

* cited by examiner

CELLULAR TELECOMMUNICATIONS NETWORKS FOR TEMPORARILY ASSOCIATING UNIQUE CONNECTION NUMBERS WITH TERMINALS HAVING TOKEN IDENTIFICATION MODULES

CROSS-REFERENCE TO RELATED APPLICATIONS

This application is a continuation of U.S. application Ser. No. 13/351,825, filed Jan. 17, 2012, which is a continuation of U.S. application Ser. No. 13/118,014, filed May 27, 2011, which is a continuation of U.S. application Ser. No. 12/935,788, filed Sep. 30, 2010, which is a 371 application of PCT/GB2009/50331, filed Apr. 2, 2009, all of said applications incorporated herein by reference.

FIELD OF THE INVENTION

The present invention relates to a telecommunications network. In particular, the invention relates to a cellular network that allows terminals having identification modules to establish a data communication where that identification module is assigned with a unique telephone number only as needed.

BACKGROUND OF THE INVENTION

In conventional cellular telecommunications networks, the activation of a subscriber identification module (SIM) requires that certain preconditions are met. Of particular interest here, the SIM must be associated with a unique telephone number (MSISDN). This familiar telephone number is generally used by a calling party wishing to make a voice (or video) call to the mobile terminal into which the SIM has been inserted. Invariably, the telephone number is selected (either automatically or in some instances by the user themselves) from a range of available Mobile Subscriber Integrated Services Digital Network (MSISDN) numbers owned by the provisioning operating company and the selected number is assigned to the SIM when the SIM is addressed for the first time by the operating company network: generally this means that the telephone number must be assigned before a user first activates the SIM under a prepay or contract arrangement.

The network operator bears a cost associated with provisioning a SIM with a valid MSISDN, both for the reservation of the MSISDN (regulators such as the ITU assign ranges of MSISDN numbers to operating companies) and for the retail staff time and overheads in registering the selected number for use.

Where that SIM appears no longer (or never to have been) used for a predetermined period, the network operators typically note this fact and initiate a "quarantine" process for returning the telephone number to the set of available numbers. Of course, this quarantining process has an associated cost: so too does reassigning that MSISDN number as ultimately will happen when it is confirmed unused after the quarantine period expires.

As the reader will readily appreciate, the provisioning of SIMs that are infrequently or never used represents a distinct inconvenience to the network operator. This inconvenience is significant even when considering the conventional provision of mobile telephones and data card/modems with SIMs. There is however a current trend to embed or otherwise SIM-enable a far wider range of computing and other electronic goods. For example, PC laptops, ultra-mobile PCs (UMPC), personal digital assistants (PDA), satellite positioning devices, set top boxes (STB), wireless access points (APs) and even onboard vehicle computers may be, and lately often are, fitted with modules that accept SIMs to enable communication over cellular telecommunication networks. Clearly, this trend implies a concomitant increase in the number of unused or infrequently used SIMs and a consequently greater level of disruption to the network operator who wishes to enable such devices.

A further problem arises in relation to the production and management of SIM cards for telematics terminals (e.g. in-car computers), where it is desirable that the terminals may be exported to a variety of geographical locations each with their own telecommunication network.

As described in prior patents GB2378097, GB2378094 and GB2378095, the problem may be addressed by ensuring that all relevant operator keys and specific parameters are pre-stored on the SIM, at the time of manufacture. Consequently, a suitably prepared SIM can be re-registered from one home network to another home network as necessary. The SIM is sent instructions regarding which authentication keys it is to use in which territory and a corresponding new SIM identifier number, IMSI.

As a result, where cars are exported, SIMs can be configured for the country of manufacture and later reconfigured for the final country. The method can also apply to other devices and can be indefinitely re-configured. Hence a terminal can be used in another network (not as a roaming subscriber) for a significant time without a new SIM card being issued. Clearly the non- or infrequent use of such "prefitted" SIMs would only amplify the problems outlined above, since this solution requires the provisioning of a plurality of available MSISDNs, one for each territory envisaged at manufacture.

In co-pending UK patent application GB 0805964.4, a new method and system are proposed to address some of the issues above. In this solution, data communications sessions can be established for terminals having identification modules that have only IMSI numbers (and not MSISDN numbers) (thereby sidestepping the need for provisioning or quarantining of SIMs). This is achieved by introducing additional network elements that can identify terminals with such identification modules and handle their requests for data sessions in a consistent way. The system of GB 0805964.4 is primarily suited to data-only communications.

However, there are circumstances where a temporary "return" communications path might be attractive in association with an otherwise data-only service. This could be a telephony service (e.g. CS voice, SMS, USSD, MMS etc) where the server initiates the communication to the client device. An example of such circumstances in telematics might be the need for communications from a telematics service provider to a particular telematics client necessitated by malfunction or abnormal usage patterns. Conventionally routing messages in this direction would require a unique telephone number, such as the MSISDN associated with each SIM.

In such circumstances, the disadvantages of using SIMs with their provisioned MSISDN remain: the provisioning and quarantining of these SIMs to terminals that never need this return channel would make offering a service to all devices prohibitively expensive.

SUMMARY OF THE INVENTION

It is therefore an object of the invention to obviate or at least mitigate the aforementioned problems.

In accordance with one aspect of the present invention, there is provided a cellular telecommunications network for temporarily associating unique connection numbers with terminals having token identification modules, the network including: a location register for receiving requests to access the network from terminals and, if the requests are associated with a token identification module, redirecting the requests; a token register which receives said redirected requests, generates token connection identification data and transmits the token connection identification data to the location register to identify the terminal to the location register; and a network gateway component for establishing a communication between the network and the terminal in accordance with the token connection identification data; the network further comprising: a network storage component for storing a table of unique connection numbers; and a messaging parsing component for processing messages addressed to terminals having token identification modules, selecting a given connection number from the table of connection numbers, associating the selected number with the location register record for a given token identification module and redirecting the messages to the terminal having the given token identification module using the associated number, wherein the messaging parsing application is communicably coupled to the token register and causes the association of selected number to token identification module by instructing a purge of the location register record for the token identification module and injecting the selected number into the location register record during reconnection.

The messaging parsing application may further triggers a Packet Data Protocol (PDP)context upon confirmation of successful receipt of a given one of said redirected messages within the terminal, thereby instigating a data connection between the terminal and the originator of said redirected message.

Upon completion of data exchange between the terminal and the originator of said redirected message, either the terminal or the originator may drop the PDP context, hence terminating the data session.

The originator of said redirected message preferably interprets termination of a data session as a trigger to re-purge the terminal from the token register in order to recover the associated number.

The terminal may further be provided with suitable loudspeaker, microphone and signal processing components.

Throughout the present description, the term "location register" should be understood to relate to a network entity performing the functionality of a HLR, a VLR and/or a network gateway component, such as a serving GPRS support node (SGSN).

The location register may be distributed, having an aggregator point for aggregating signalling functionality and a network entity for carrying out further location register functionality, said aggregator point and said network entity being in communication with one another. Examples of further location register functionality include the temporary storage of IMSI numbers.

In accordance with a further aspect of the present invention, there is provided a method for temporarily associating unique connection numbers with devices having token identification modules, the method comprising at least: providing a pool of unique connection numbers; in response to a request for communication with a device incorporating a token identification module, assigning a selected one of the pooled numbers to the first token identification module in a token register; and initiating a reconnection event, thereby providing the assigned number to the device.

The step of initiating a reconnection event preferably comprises: instructing a purge of a location register record for the token identification module; and injecting the selected number into a token register record during reconnection.

The request for communication may be a request to deliver a message addressed to a device having a token identification module; in which case the method may further comprise: receiving said message, and redirecting the message to the device using the assigned number.

The method may further comprise triggering a PDP context upon confirmation of successful receipt of said redirected message within the terminal, thereby instigating a data connection between the device and the originator of said redirected message.

Upon completion of data exchange between the device and the originator of said redirected message, the PDP context may be dropped, either at the device or at the originator, hence terminating the data session.

Once the communication has been completed, the assignment of the assigned number may be purged from the location register. The method may therefore further comprise re-purging the device from the location register upon termination of a data session in order to recover the assigned number.

Throughout this document, the pool of connection numbers are considered "unique" in so much as there can be only one instance of each connection number in the network at any given time. A single connection number may, of course be used serially for more than one device over a period of time, but not simultaneously.

BRIEF DESCRIPTION OF THE DRAWING FIGURES

For a better understanding of the present invention, reference will now be made, by way of example only, to the accompanying drawings in which.

DETAILED DESCRIPTION OF THE PREFERRED EMBODIMENTS

Figure 1:
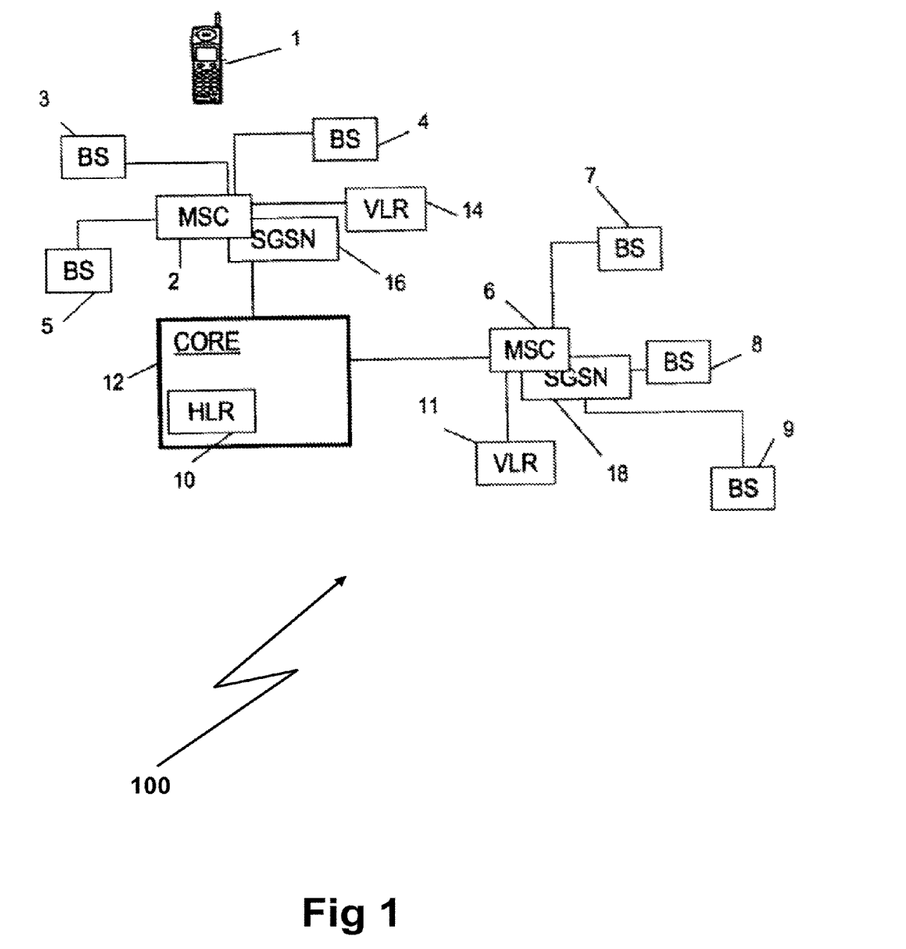
FIG. 1 illustrates key elements of a cellular telecommunications network, and its operation.

FIG. 1 illustrates the interrelation of those key elements of a cellular telecommunications network relevant to the operation of the invention.

A telecommunications network 100 includes a plurality of base stations (BS) 3, 4, 5, 7, 8, and 9 and a core network 12.

Each base station (B S) corresponds to a respective cell of the telecommunications network and receives calls from and transmits calls to a terminal in that cell by wireless radio communication in one or both of the circuit switched or packet switched domains. Such a subscriber's terminal is shown as 1. The terminal may be a handheld mobile telephone, a personal digital assistant (PDA) or a laptop computer equipped with a datacard.

Each base station comprises a base transceiver station (BTS) and a base station controller (BSC). A BSC may control more than one BTS. The BTSs and BSCs comprise the radio access network.

Conventionally, the base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1.

Each subscriber to the network is provided with at least one smart card or subscriber identity module (SIM) card (strictly speaking a UICC) which, when associated with the user's mobile terminal, identifies the subscriber to the network. The terminal typically has an identifier of its own (the "International Mobile Equipment Identity", IMEI), which can be obtained in certain networks, however this terminal ID is not essential in identifying the subscriber to the network. The SIM card is preprogrammed with a unique identification number, the "International Mobile Subscriber Identity" (IMSI) which can be accessed on the card but which is not generally known to (or used directly by) the subscriber. Printed on the outside of each SIM, there is a further unique identification number, the ICCID/SIM Serial number (SSN), which is unrelated to the IMSI number. The subscriber is issued with a further, publicly known, number, that is, the subscriber's telephone number, by means of which calls to the subscriber are initiated by callers. This number is the Mobile Subscriber ISDN Number (MSISDN).

The core network includes a home location register (HLR) 10 which, for each subscriber to the network, stores the IMSI and the corresponding MSISDN together with other subscriber data, such as the current or last known location of the subscriber's mobile terminal. A second register, the visitor location register (VLR) 14, is used to store the IMSI and the corresponding MSISDN for subscribers that are active in the network temporarily.

When the subscriber wishes to activate their terminal in the network (so that it may make or receive calls subsequently), the subscriber places their SIM card in a card reader associated with the terminal (terminal 1 in this example).

When the terminal 1 is switched on, it searches for a mobile network to which to connect. Once the terminal identifies the desired network, it sends a message to the network (via the base station 3 associated with the particular cell of that network in which the terminal 1 is located) to indicate that it wishes to be registered to that particular network. This message includes the IMSI (read from the card). In a conventional network, the base station (BS 3) transmits this message containing the IMSI to the MSC 2 who controls BS 3.

An identical sequence of events happens whenever the connection is lost (e.g. as a result of a 'forced reconnect' in the network; as a result of the device entering an area of poor coverage—a tunnel, say—then returning to full coverage): in this case the sequence of events is referred to as reconnection.

The MSC 2 passes the IMSI to the VLR 14, which in turn checks its database to determine whether there is an existing record of the particular subscriber.

If no record is found, the VLR 14 indicates this to the MSC 2 and the MSC 2 accesses the appropriate location in the HLR 10 present in the network core 12. The MSC 2 then extracts the corresponding subscriber MSISDN and other subscriber data from the appropriate storage location, and stores it temporarily in a location in the VLR 14. Then an acknowledge message is sent to the terminal. In this way, therefore the newly active subscriber is effectively registered with a particular MSC (MSC 2), and the subscriber's information is temporarily stored in the VLR (VLR 14) associated with that MSC.

When the HLR 10 is interrogated by the MSC 2 in the manner described above, the HLR 10 additionally performs an authentication procedure for the terminal 1. The HLR 10 transmits authentication data to the MSC 2 in "challenge" and "response" forms. Using this data, MSC 2 passes a "challenge" to the terminal 1 through base station 3. Upon receipt of this data, the terminal 1 passes this data to its SIM and produces a "response". This response is generated using an encryption algorithm on the SIM and a unique key, Ki, on the SIM. The response is transmitted back to the MSC 2 which checks it against information that it has obtained for that subscriber from the HLR 10 in order to complete the authentication process. If the response from the terminal 1 is as expected, the terminal 1 is deemed authenticated. At this point the MSC 2 requests subscription data from the HLR 10. The HLR 10 then passes the subscription data to the VLR 14.

The authentication process will be repeated at regular intervals while the terminal 1 remains activated and can also be repeated each time the terminal requests or receives telephony service, if required (this process is known as "paging").

Each of the MSCs of the network (MSC 2 and MSC 6) has a respective VLR (14 and 11) associated with it and operates in the same way as already described when a subscriber activates a terminal in one of the cells corresponding to one of the base stations controlled by that MSC.

When the subscriber using terminal 1 wishes to make a voice call, having already inserted the SIM card into the reader associated with this terminal, the SIM has been authenticated in the manner described, and the terminal having successfully registered onto the network, a call may be made by entering the telephone number of the called party in the usual way. This information is received by the base station 3 and is then routed to the called party via the MSC 2. By means of the information held in the VLR 14, MSC 2 can associate the call with this particular subscriber and thus record information for charging purposes.

The MSCs 2 and 6 support communications in the circuit switched domain—typically voice calls. Corresponding network gateway components, SGSNs 16 and 18, are provided to support communications in the packet switched domain—such as GPRS data transmissions. The SGSNs 16 and 18 function in an analogous way to the MSCs 2 and 6. The SGSNs 16, 18 are equipped with an equivalent to the VLR for the packet switched domain. Here each active session has an associated PDP context.

Figure 2:
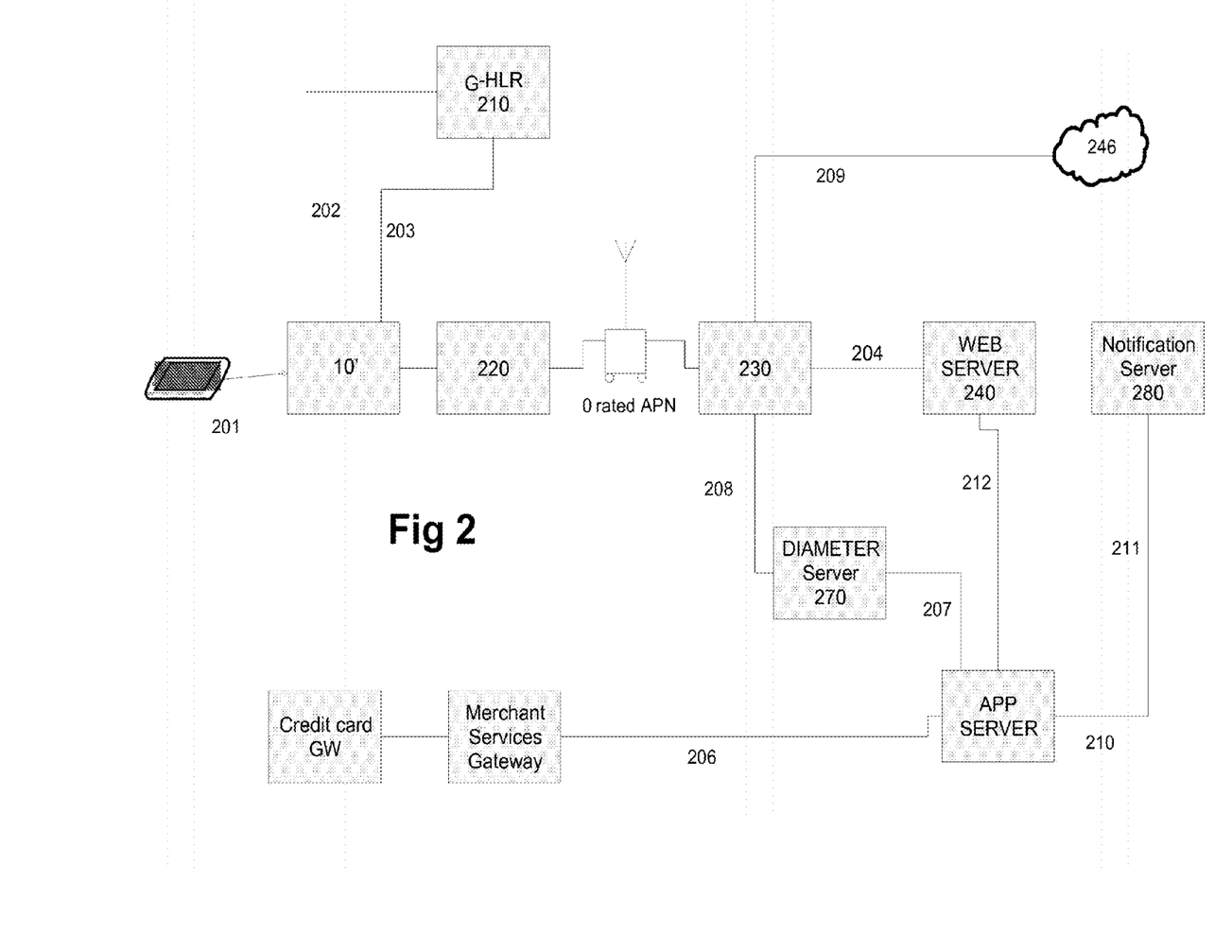
FIG. 2 illustrates key elements of a cellular telecommunications network in accordance with co-pending UK patent application GB 0805964.4.

FIG. 2 shows a cellular network arrangement suitable for allowing data communication between a terminal and the network in accordance with co-pending UK patent application GB 0805964.4. Where components are substantially identical to components shown in FIG. 1, the same reference numerals are adopted in FIG. 2.

Here, identification modules are treated as unique tokens that have not yet been associated with a particular subscriber: they are consequently referred to a token identification modules, or TIMs. Typically, a TIM card has the same form factor as a SIM card and is interchangeable therewith. Just like SIM cards, TIMs are preprogrammed with at least one unique identification number, the "International Mobile Subscriber Identity" (IMSI) which is accessible on the card. The TIM is however not associated with a publicly known number (i.e. a MSISDN). In this sense, the TIM is considered to be an "unprovisioned" SIM.

As TIMs have no MSISDN permanently associated with them, they can be used in environments where it is uncertain when any given TIM will be used or indeed whether that TIM will be used at all. This is commercially important in typical cellular networks where there is a cost associated with provisioning a SIM with a valid MSISDN and a further cost associated with quarantining and ultimately reassigning that MSISDN number when it is unused for a predetermined period (typically of the order of six to nine months).

To handle the initial requests for a connection to the network, the network of FIG. 2 includes a global HLR (G-HLR) 210 and a network entity 10'.

Note that much as it does in co-pending UK patent application GB 0805964.4, the network entity 10' in FIG. 2 represents a location register and hence represents a local home location register (HLR) (identical to HLR 10 in the FIG. 1 network), local VLR/MSC (VLR 14 & MSC 2 in the FIG. 1 network), local SGSN (SGSN 16 in the FIG. 1 network) or a local SCP entity (such as an SCCP Relay).

When the user of the terminal 1' wishes to activate their terminal in the network (so that it may open a data connection subsequently), the user places a TIM card in a card reader associated with the terminal (terminal 1' in FIG. 2). The terminal 1' then connects to the radio network (step 201).

As for FIG. 1, connection to the radio network in FIG. 2 amounts to a request to register the terminal onto the network using the terminal's TIM IMSI. From IMSI analysis, the location register 10' determines that the IMSI number provided by the TIM belongs to another register. The request for connection is then forwarded to the G-HLR 210 (step 202). The G-HLR 210 then extracts the IMSI number from this request and, assuming the IMSI number is in a range maintained by the G-HLR 210, transmits a token signal to the location register 10' (step 203) that the IMSI has been recognized by the G-HLR 210 (this token signal may simply be a confirmation signal (OK') but it may include further profile information).

The location register 10', upon receipt of the token signal, stores the IMSI temporarily in a location register store (this could be VLR 14, SGSN 220 or both). In this way, the user of the terminal 1' is effectively registered within a particular MSC (MSC 2) and/or a particular SGSN (SGSN 220), and any profile information associated with the TIM is temporarily stored in the VLR (VLR 14) associated with that MSC and/or the SGSN 220.

GHLR 210 additionally performs an authentication procedure for the terminal 1'. The GHLR 210 transmits authentication data to MSC 2 and/or SGSN 220 in "challenge" and "response" forms. Using this data, MSC 2 and/or SGSN 220 passes a "challenge" to the terminal 1' through base station 3. Upon receipt of this data, the terminal 1' passes this data to its TIM and produces a "response". This response is generated using an encryption algorithm on the TIM and a unique key, Ki', on the TIM. The response is transmitted back to the MSC 2 and/or SGSN 220 which checks it against information that it has obtained for that token from the G-HLR 210 in order to complete the authentication process. If the response from the terminal 1' is as expected, the terminal 1' is deemed authenticated.

The authentication process will be repeated at regular intervals while the terminal 1' remains activated and can also be repeated each time the terminal requests or receives telephony service, if required.

When the user of terminal 1' wishes to establish a data connection, having already inserted the TIM card into the reader associated with this terminal and the validity of the TIM has been confirmed by the G-HLR 210 in the manner described, the request for a data connection is passed to a network gateway component 220 (i.e. SGSN 16) and a gateway session is established.

The network gateway component 220 receives from the G-HLR 210 a key corresponding to the IMSI. This key is used, in turn, to query a network monitoring component 230 (e.g. NGME or GGSN) which determines whether the key data is associated with an existing, valid session (typically a native DIAMETER or RADIUS session). The signalling between the network gateway component 220 and the network monitoring component 230 is preferably zero-rated so that the user is not billed for the establishment of the session.

If a valid session already does exist for this key data, the data connection is established (step 209). The terminal 1' has access to a requested internetwork 246—typically the Internet or a corporate intranet.

If however no valid session can be found that corresponds to the key, the terminal 1' may instead be redirected to a webpage generated by a web server 240. The webpage presented is tailored to the terminal 1' in accordance with key data and offers the user at least one user action option.

The network monitoring component 230 then acts as an internetwork gateway: denying or allowing access from the cellular network 100 to the requested internetwork 246 in dependence upon the information input by the user in relation to the selected user action option. In a typical scenario, the webpage offers the option of a time-limited session for a predetermined price. The selection of that option leads the user to a user dialog requesting user billing information, including for example: name, address, credit/debit card details, voucher/coupon information, existing phone no. to which to bill/SMS etc.

Session control is provided by a session control server (preferably a native DIAMETER server). The session control server issues regular reports on the sessions it manages (so-called "event tickets"). In a native DIAMETER-based session, the network monitoring component 230 can use the DIAMETER event tickets for each valid session to monitor the session usage of each user.

Clearly, the network monitoring component 230 can also use the DIAMETER event tickets for each valid session to monitor the session usage of groups of users (as might be required in providing services to a business or "enterprise"). This arrangement facilitates so-called "mediated billing" so that an enterprise can aggregate the bills for groups of enterprise users. Mediated billing may be effected by presenting information about monitored sessions to an administrator or agent for the enterprise through an enterprise monitoring and central billing application.

PDP Context is a term referred to at a number of points in the present discussion. It takes the following conventional, standardized meaning throughout. The PDP (Packet Data Protocol, e.g. IP, X.25, FrameRelay) context is a data structure present on both the SGSN and the GGSN which contains the subscriber's session information when the subscriber has an active session. When a mobile terminal wants to use GPRS, it must first attach and then activate a PDP context. When an external entity wishes to establish a GPRS connection to the mobile terminal (step 302), the network must first establish the network element connections (PDU notification) before requesting activation of PDP context by the target mobile terminal (see FIG. 3). Either way a PDP context data structure is allocated in the SGSN that the subscriber is currently visiting and the GGSN serving the subscriber's access point. The data recorded includes.

Figure 3:
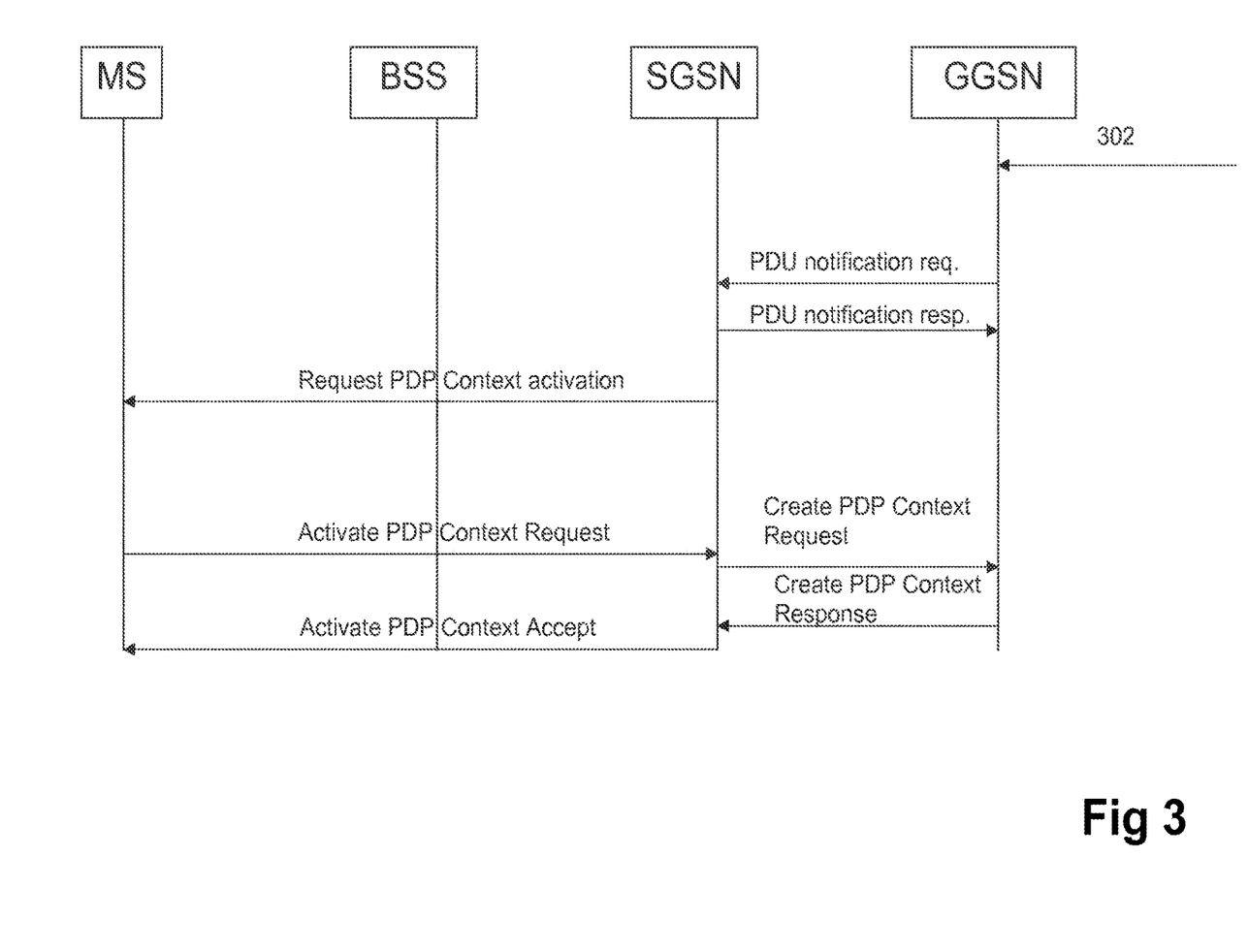
FIG. 3 illustrates the elements in establishing a PDP context between a GPRS network and a terminal (e.g. Mobile Station) as a result of an external request for communication with the terminal.

Subscriber's IP address
Subscriber's IMSI
Subscriber's
  Tunnel Endpoint ID (TEID) at the GGSN
  Tunnel Endpoint ID (TEID) at the SGSN The Tunnel Endpoint ID (TEID) is a number allocated by the respective GSN which identifies the tunnelled data related to a particular PDP context.

Figure 4:
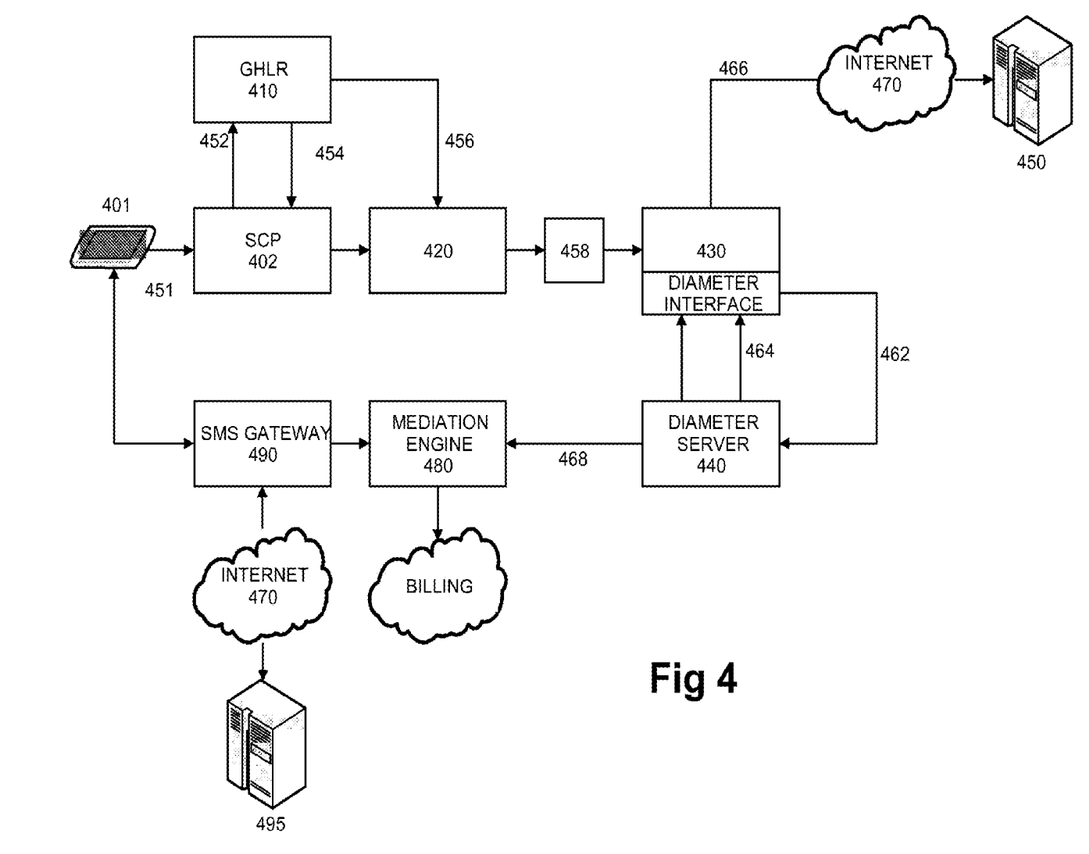
FIG. 4 illustrates the flow of events in providing data sessions to a device for use in a machine to machine environment in accordance with GB 0805964.4.
Figure 5:
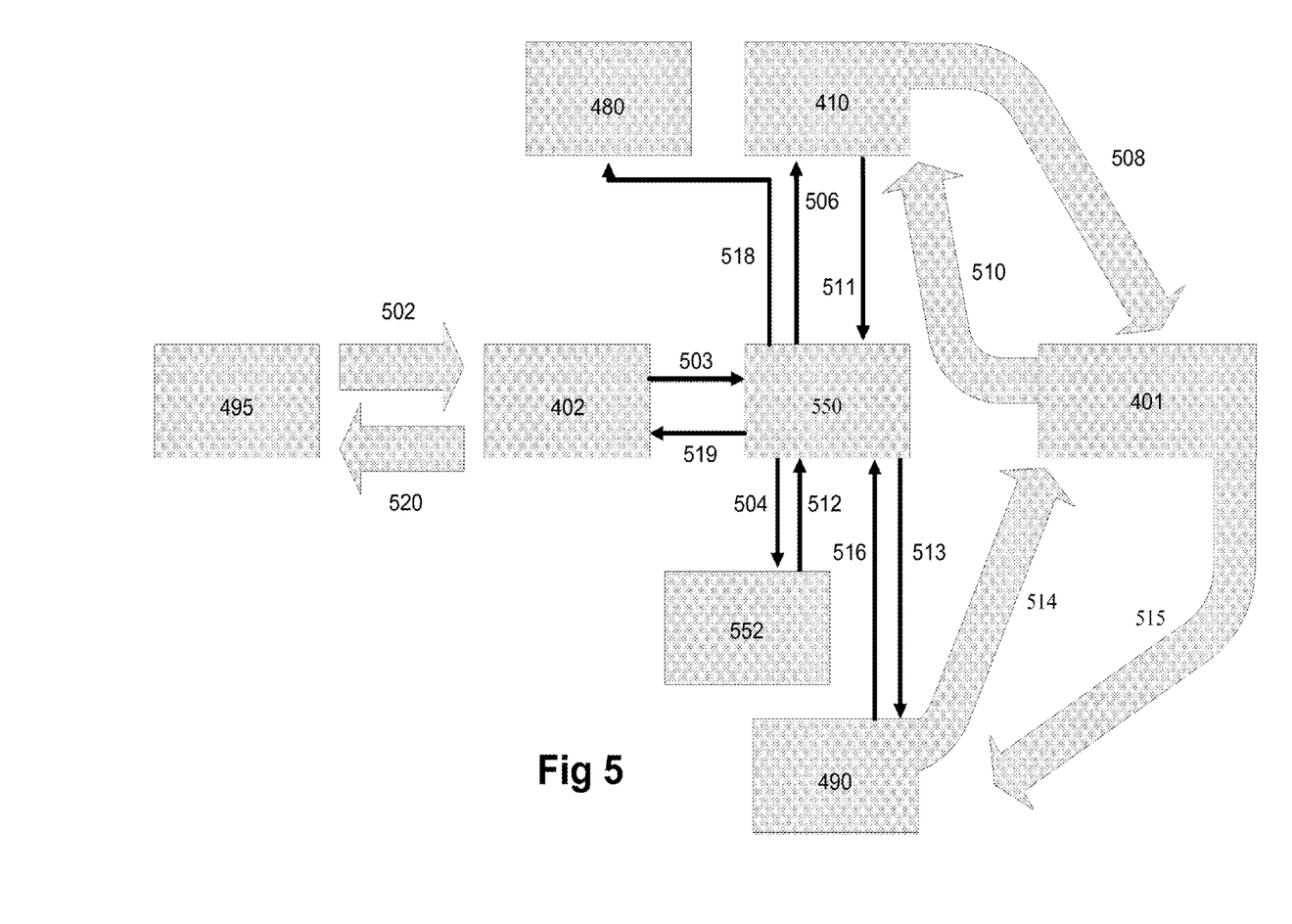
FIG. 5 illustrates the flow of events in enabling a provider message to be delivered to a terminal having an identification module with an IMSI but no unique telephone number, in accordance with the present invention.

The operation of the invention may be understood by considering a specific embodiment, illustrated in FIGS. 4 & 5. FIG. 4 shows the processing of a request for a machine to machine data session from a machine to machine client terminal with an embedded TIM but having no provisioned MSISDN number; while FIG. 5 concerns the delivery of a provider message to that M2M client terminal with an embedded TIM.

In FIG. 4, the network includes a SCP 402 and a global HLR (G-HLR) 410. The mobile terminal 401 in this case is a machine to machine (M2M) client with an embedded TIM.

The SCP 402 may subsume the functionality of the HLR 10 in the FIG. 1 network. Alternatively the SCP 402 may subsume the functionality of a VLR 14 & MSC 2 and/or the functionality of an SGSN 16. Clearly, the SCP 402 may also incorporate an SS7 aggregator (such as an SCCP Relay) to aggregate the signalling functionalities that would otherwise be required of the HLR 10, VLR 14 and/or the SGSN 16.

When the M2M client 401 requires to be activated in the cellular network (so that it may open a data connection subsequently), the client "starts" a data connect application executing on its operating system, typically in response to a trigger event. The M2M client 401 then connects to the radio network (step 451).

As for FIG. 1, connection to the radio network in FIG. 4 amounts to a request to register the terminal onto the network using the terminal's TIM IMSL. From IMSI analysis, the SCP 402 determines that the IMSI number provided by the TIM belongs to another register. The request for connection is then redirected to the G-HLR 410 (step 452). The G-HLR 410 then extracts the IMSI number from this request and, assuming the IMSI number is in a range maintained by the G-HLR 410, transmits a token signal to the SCP 402 (step 454) that the IMSI has been recognized by the G-HLR 410 (this token signal may simply be a confirmation signal (OK') but it may include further profile information).

The SCP 402, upon receipt of the token signal, stores the IMSI temporarily in a location register store (this could be in the VLR (not shown), SGSN 420 or both). In this way, therefore the M2M client 401 is effectively registered with a particular MSC (not shown) and/or SGSN 420, and any profile information associated with the TIM is temporarily stored in the VLR associated with that MSC and/or SGSN 420.

The request for a data connection is passed by the SCP 402 to a network gateway component 420 (i.e. SGSN 16). The network gateway component 420 receives from the G-HLR 410 a key corresponding to the IMSI (step 456). Taking the key, together with the forwarded request for a data connection, network gateway component 420 establishes a gateway session. This key is used, in turn, to query a network monitoring component 430 (e.g. NGME or GGSN) which determines whether the key data is associated with an existing, valid session (typically a native DIAMETER session). The signalling (step 458) between the network gateway component 420 and the network monitoring component 430 is preferably zero-rated so that the client device 401 is not billed for the establishment of the session.

Assuming that no valid session corresponding to that key exists, the network monitoring component 430 interfaces with a DIAMETER server 440 to authenticate a new M2M data session (step 462) for the M2M client 401.

The DIAMETER server 440 in turn signals to the network monitoring component 430 that a session should be opened (step 464).

The network monitoring component 430 then redirects the user to a requested M2M server 450 via a fixed-line network such as the internet 470 (step 466) and simultaneously changes the billing status of the M2M client session from zero rated to a data rate.

At the end of a prearranged session, the DIAMETER server 440 instructs the network monitoring component 430 to place the session on hold (and zero-rates the session).

The DIAMETER server 440 also pushes a usage alert (using DIAMETER tickets, step 468) to a billing mediation engine 480, which generates a billing event corresponding to the reported session usage.

The M2M client sends and receives short text messages (SMS) to a dedicated M2M SMS platform 495. These SMS messages are transported in a conventional manner through an SMS Gateway 490 and then across an internet connection 470 to the M2M SMS platform 495.

As explained previously, there are situations where an external party may wish to transmit a message to (or make a voice call to) the M2M client terminal.

To establish a connection from the provider (server) side, the provider sends a provider message (step 502) from the M2M SMS platform 495 addressed to the M2M terminal 401: the message being formatted to include the terminal's IMSI number (in the absence of an MSISDN) in the destination field. The B-party in such messages may be indicated by a short code unique to the provider's SMS platform 495. The message is transferred via the SCP Gateway 402 and ultimately to the SMS Gateway 490.

The SCP Gateway 402 receives the provider message with IMSI number in the destination field and passes it to a messaging parsing application 550 (step 503), the application may be executed on a VLR, HLR, SGSN or other SCP entity (such as an SCCP Relay) The parsing application 550 queues incoming provider messages (step 504) in a message queue 552, accesses a table of pooled MSISDN numbers (PADS) and injects a selected one of the pooled connection numbers into that terminal's HLR subscription record and instructs an HLR purge (step 506) for the addressed IMSI record corresponding to the said terminal to the G-HLR 410 (forcing the terminal having that IMSI number to undergo reconnection, step 508)

During its next reconnection request (step 510) the terminal 401 will automatically trigger a location update event. In accordance with 3GPP TS 23.012 the location update procedure includes a step whereby the terminal supplies its IMSI number to the HLR and requests reconnection to the network.

Upon receipt of an acknowledgement that reconnection has been completed (step 511), the parsing application overwrites the IMSI in the provider message with the newly assigned MSISDN (step 512) and provides the provider message together with the MSISDN to the SMS Gateway 490 (step 513). The SMS Gateway 490 can then pass the provider message to the terminal 401 as a conventional SMS, now addressed to the assigned MSISDN (step 514).

Acknowledgement of delivery of the provider message to the terminal 401 is signalled to the parsing application 550 (step 515/516), which allows the parsing application to send a usage report (CDR) to the mediation engine 480 (step 518) and a delivery notice to the M2M SMS platform 495 of the provider (step 519/520) (this notice need only confirm delivery to the terminal's IMSI).

Successful receipt of this SMS within the terminal may trigger a client-initiated PDP context, instigating a data connection between the client terminal 401 and the M2M server 450.

On completion of data exchange, either the terminal or the M2M server may drop the PDP context, hence terminating the data session. The M2M server may consider this a trigger to re-purge the terminal from the GHLR (as described in the initial purge above) in order to recover the assigned MSISDN.

In a further embodiment, a terminal is further provided with suitable loudspeaker, microphone and signal processing components. The invention then allows the terminal to operate a limited voice capability. There are a couple of scenarios where this might be required: calls from the terminal to an M2M service number and establishing a call to emergency services.

As for the instance of provider message delivery, the provider may alternatively request a voice connection to the M2M client. The initial request must be made through SCP 402, where the absence of MSISDN (or other unique associated telephone number) is detected, temporary MSISDN is inserted into the GHLR record and the M2M client is purged from the network in order to obtain the temporary MSISDN in the manner illustrated in FIG. 5. The call request is passed to the VLR using the MSISDN as the A-number.

In cases where the provider (or network operator) wishes to record cost charges against a particular user, the network requires the introduction of an intelligent network (IN) node to track call charges.

What is claimed is:

1. A cellular telecommunications network for temporarily associating unique connection numbers with terminals having token identification modules, the network comprising:
    a location register for receiving a request to access the network from a terminal and, when the request is associated with a token identification module, wherein the token identification module is a module which is not permanently associated with a publicly known number, redirecting the request;
    a token register which receives said redirected request, obtains token connection identification data and transmits a signal indicating to the location register that the identity of the terminal has been recognized; and
    a network gateway component for establishing a communication session between the network and the terminal in accordance with the token connection identification data obtained from the token register; the network further comprising:
    a network storage database for storing a table of unique connection numbers; and
    a messaging parsing component for processing messages addressed to terminals having token identification modules, selecting a given connection number from the table of unique connection numbers, associating the selected number with the token register record for a given token identification module and redirecting the messages to the terminal having the given token identification module using the associated selected number,
    wherein a messaging parsing application is communicably coupled to the token register and causes the association of the selected number to the token identification module by instructing a purge of the location register record for the token identification module and injecting the selected number into the token register record during reconnection; and
    wherein the messaging parsing application further triggers a Packet Data Protocol (PDP) context upon confirmation of successful receipt of a given one of said redirected messages within the terminal, thereby instigating a data connection between the terminal and an originator of said redirected message.

2. The cellular telecommunications network as claimed in claim 1, wherein the token identification modules are associated with a unique identifier.

3. The cellular telecommunications network as claimed in claim 1, wherein upon completion of data exchange between the terminal and the originator of said redirected message, the terminal drops the PDP context, hence terminating the data session.

4. The cellular telecommunications network as claimed in claim 1, wherein upon completion of data exchange between the terminal and the originator of said redirected message, the originator drops the PDP context, hence terminating the data session.

5. The cellular telecommunications network as claimed in claim 1, wherein the originator of said redirected message interprets the termination of a data session as a trigger to repurge the terminal from the token register in order to recover the associated number.

6. The cellular telecommunications network as claimed in claim 1 wherein the terminal is further provided with suitable loudspeaker, microphone and signal processing components.

7. The cellular telecommunications network as claimed in claim 1 wherein the location register is distributed, having an aggregator point for aggregating signaling functionality and a network entity for carrying out further location register functionality, said aggregator point and said network entity being in communication with one another.

8. A method of temporarily associating unique connection numbers with terminals having token identification modules, said method comprising:
    receiving at a location register a request to access a network from a terminal and, when the request is associated with a token identification module, wherein the token identification module is a module which is not permanently associated with a publicly known number, redirecting the request;
    receiving said redirected request via a token register, obtaining token connection identification data and transmitting a signal indicating to the location register that the identity of the terminal has been recognized;
    establishing in a network gateway component a communication session between the network and the terminal in accordance with the token connection identification data obtained from the token register; wherein the network further comprises a network storage database for storing a table of unique connection numbers and a messaging parsing component for processing messages addressed to terminals having token identification modules,
    selecting a given connection number from the table of unique connection numbers,
    associating the selected number with the token register record for a given token identification module and redirecting the messages to the terminal having the given token identification module using the associated selected number,
    communicably coupling a messaging parsing application to the token register and causing the association of the selected number to the token identification module by instructing a purge of the location register record for the token identification module and injecting the selected number into the token register record during reconnection; and having the messaging parsing application trigger a Packet Data Protocol (PDP) context upon confirmation of successful receipt of said redirected message within the terminal, thereby instigating a data connection between the device and an originator of said redirected message.

9. The method as claimed in claim 8, further comprising, upon completion of data exchange between the device and the originator of said redirected message, dropping, at the device, the PDP context, hence terminating the data session.

10. The method as claimed in claim 8, further comprising, upon completion of data exchange between the device and the originator of said redirected message, dropping, at the originator, the PDP context, hence terminating the data session.

11. The method as claimed in claim 8, further comprising, re-purging the device from the token register upon termination of a data session in order to recover the assigned number.

12. A network as claimed in claim 1, wherein the token identification module is a module which is not associated with a subscriber which is issued with a public number that allows the subscriber to initiate a call.

* * * * *